June 11, 1935.  R. E. MILLER  2,004,669
PACKING CUP
Filed Sept. 9, 1932   2 Sheets-Sheet 1
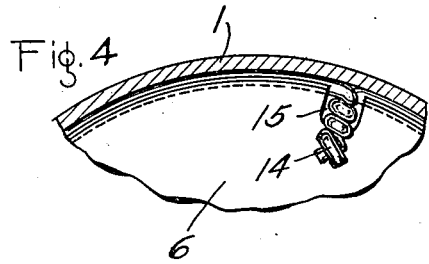
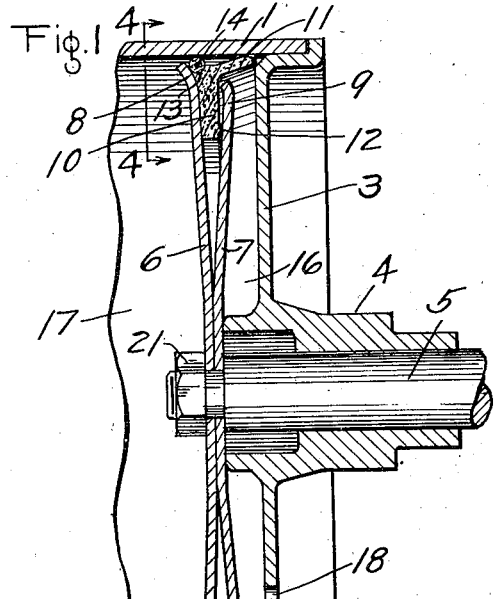
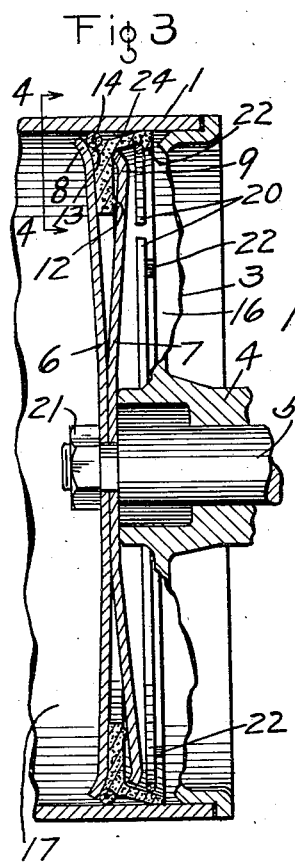
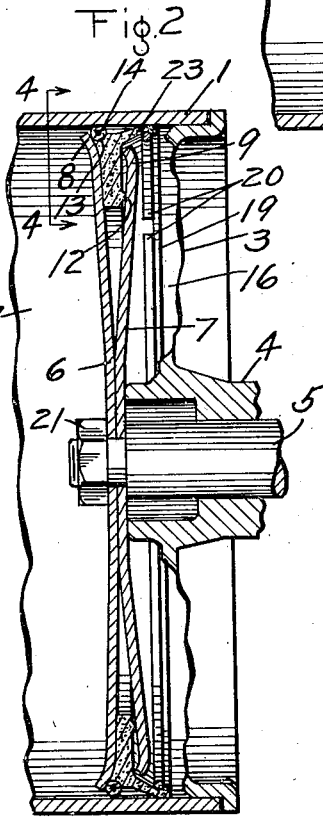
INVENTOR
RAYMOND E. MILLER
BY
ATTORNEY June 11, 1935.  R. E. MILLER  2,004,669
PACKING CUP
Filed Sept. 9, 1932  2 Sheets-Sheet 2
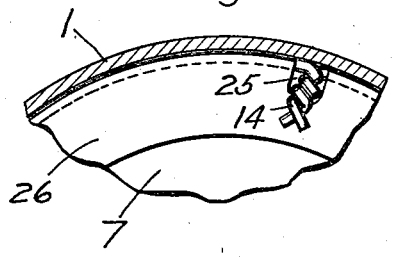
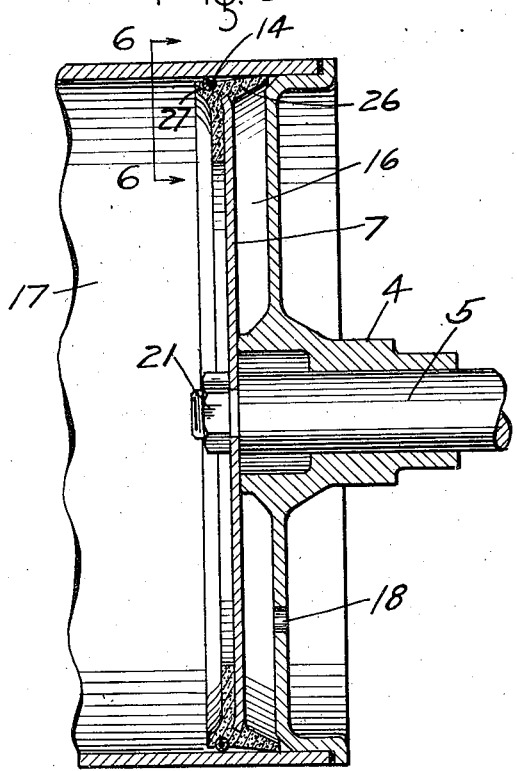
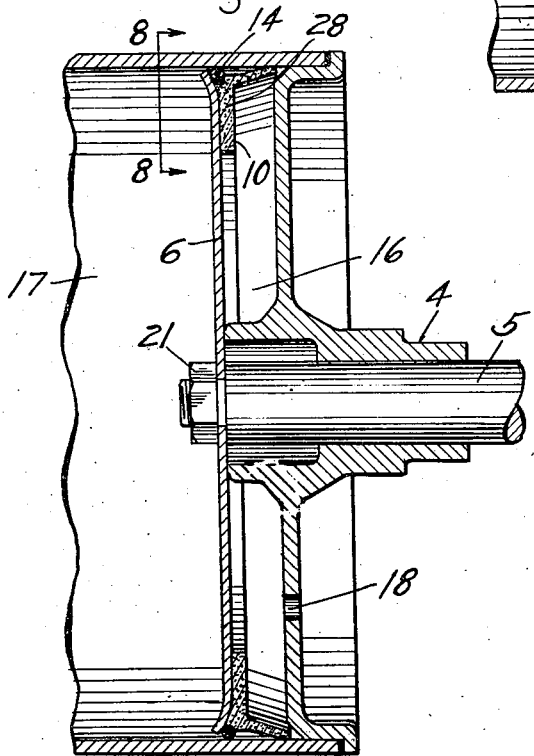
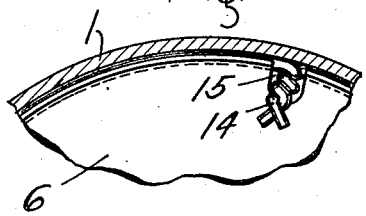
INVENTOR.
RAYMOND E. MILLER
By Wm. M. Cady
ATTORNEY.

Patented June 11, 1935

2,004,669

UNITED STATES PATENT OFFICE 2,004,669

PACKING CUP

Raymond E. Miller, Wilkinsburg, Pa., assignor to The Westinghouse Air Brake Company, Wilmerding, Pa., a corporation of Pennsylvania Application September 9, 1932, Serial No. 632,362

7 Claims. (Cl. 309—6)

This invention relates to piston packings and more particularly to the cup-shaped type employed in brake cylinders and the like.

More specifically, the invention relates to an improved vacuum controlled piston for an automobile clutch operating cylinder, the piston being of the type employing a composition packing cup.

One object of the invention is to provide an improved composition piston packing cup having means adjacent the heel of the flared portion or skirt for carrying a lubricating member, by means of which lubricant is spread over the cylinder wall upon reciprocation of the piston in the cylinder.

Another object of the invention is to provide an improved piston for a brake cylinder, clutch cylinder or the like, the piston consisting of a metal disc and a composition packing cup permanently secured to said disc, thereby providing a unitary structure not requiring the customary follower plate.

In order to provide a composition packing cup which will move in a cylinder with low resistance, the greatest diameter over the skirt or flare of the packing cannot be much greater than the diameter of the cylinder in which it is adapted to operate. A packing cup of this character, if stored for a long period of time, tends to warp slightly, so that when applied to a cylinder, the skirt may not bear against the cylinder wall at certain spots or over certain areas.

Another object of my invention is to provide means for overcoming the above difficulty and for this purpose the packing cup is provided interiorly, and adjacent the outer edge of the skirt, with an annular rib or a plurality of spaced lugs for retaining an expander ring adapted to exert a pressure on the skirt for trueing up the skirt to the cylindrical contour of the cylinder and thereby obtain engagement of the skirt with the cylinder all of the way around the cylinder.

In the accompanying drawings: Fig. 1 is a sectional view of a cylinder and piston provided with one form of my improved piston packing cup; Fig. 2 is a sectional view of a cylinder and piston similar to that shown in Fig. 1, but showing means integral with the packing cup for retaining an expander ring; Fig. 3 is a sectional view of a cylinder and piston similar to that shown in Fig. 2, but showing another form of expander ring retaining means; Fig. 4 is a sectional view of the cylinder and piston shown in Figs. 1, 2 and 3 and taken on the line 4—4; Fig. 5 is a sectional view of a cylinder and piston in which the packing cup is molded to the piston disc; Fig. 6 is a sectional view of the cylinder and piston shown in Fig. 5 and taken on the line 6—6; Fig. 7 is a sectional view of a cylinder and piston showing another form of unitary piston disc and packing cup construction; and Fig. 8 is a sectional view taken on the line 8—8 of Fig. 7.

As shown in Fig. 1 of the drawings, the clutch operating device comprises a cylinder 1 and a piston operatively mounted in the cylinder. The cylinder 1 may be closed at one end by a head 3, which is provided centrally with a sleeve-like portion 4 through which a rod 5, secured to the piston, is adapted to slide upon reciprocating movement of said piston in the cylinder 1.

The piston comprises two metal discs 6 and 7, secured to the end of piston rod 5 by means of a nut 21. The disc 6 is provided with an inwardly flared portion 8 adjacent its periphery, while the disc 7 is provided with a similarly flared portion 9. According to the invention, a rubber composition packing cup is clamped between the outer ends of the two discs 6 and 7.

The composition packing cup comprises a central ring-like portion 10, secured between the discs 6 and 7, and a flared or skirt portion 11 integral with the portion 10 and engaging the wall of cylinder 1. The ring portion 10 of the packing cup is provided on one side with an annular bead 12 engaging the piston disc 7 for effecting a leak-proof seal. The opposite side of the ring portion 10 follows the flaring contour of the piston disc 6 and at the heel of the cup, or where the ring portion 10 meets the skirt 11, the packing cup is provided with a groove 13, which cooperates with the portion of piston disc 6 extending beyond the packing cup to provide an annular recess in which is mounted a lubricating member or wick 14 which engages the wall of cylinder 1.

The wick 14 preferably comprises short cotton fibres, or other lubricant absorbing and conveying material, secured between two wires twisted together so as to form a continuous wick, which is wound around the piston in the above described annular recess. The two ends of the wick 14 are brought out from the annular recess through an opening 15 in the piston disc 6 and then twisted together, so as to securely hold the wick in place.

This piston forms at one side a chamber 16 and at the opposite side a chamber 17. The chamber 16 is open to the atmosphere through an aperture 18 in the cylinder head 3, while chamber 17 at one time is adapted to be connected to a source (not shown) of partial vacuum, and it will be evident that when chamber 17 is open to a partial vacuum, atmospheric pressure in chamber 16 will move the piston toward the left hand, the skirt 11 of the packing cup acting to prevent leakage from chamber 16 to chamber 17, while the wick 14, which is supplied with lubricant, spreads the lubricant along the wall of the cylinder 1. When the vacuum in chamber 17 is destroyed, the piston may be returned to its initial position by mechanical means (not shown) or otherwise.

A lubricant, such as petroleum jelly, is generally employed for lubricating pistons of this character, and it is intended that the wick 14 be well filled with such lubricant and that the periphery of the piston and the wall of cylinder 17 be properly lubricated at the time the piston is assembled in the cylinder. This device may however at times be subject to such heat as will cause the lubricant to soften and run to the lowest part of the cylinder. The piston is most of the time at the right hand end of the cylinder, since it is only moved therefrom when a clutch is operated, so that in case the lubricant does gather at the lowest part of the cylinder, substantially all of it will be at the low pressure or left hand side of the piston. It will be noted that between the periphery of the wick retaining groove in the piston and the wall of the cylinder, there is a clearance space which opens to the low pressure side of the piston, so that any softened or liquid lubricant which may collect at the bottom of the cylinder on that side of the piston, may flow to and around the wick 14 which absorbs such lubricant, and by means of capillary action, conveys same peripherally around the piston, the whole wick 14 thereby being maintained saturated with lubricant so as to at all times insure adequate lubrication for the piston.

In the packing cup shown in the device in Fig. 2, an annular bead 19 is provided interiorly and adjacent the extreme outer edge of the packing cup skirt 23, otherwise the construction is the same as shown in Fig. 1. An expander ring 20 is mounted in the packing cup against the bead 19, said bead acting to hold the expander ring 20 in place. The expander ring, which is provided to ensure full engagement of the skirt of the packing cup with the wall of the cylinder, consists merely of a section of spring wire bent in the form of a circle of sufficient diameter to exert the required pressure against the skirt of the packing cup when installed as shown in the drawings.

In the construction shown in Fig. 3, the expander ring 20 is held in place by means of a plurality of equally spaced lugs 22 projecting inwardly from the skirt 24 of the packing cup, otherwise the construction is the same as shown in Figs. 1 and 2.

In the construction disclosed in Figs. 1, 2 and 3, the packing cup is held between the ends of the two piston plates or discs 6 and 7. According to the construction illustrated in Fig. 5, a packing cup 26 is permanently molded onto the piston disc 7, thereby eliminating the use for the piston disc 6. In order to secure the packing cup 26 to the piston disc, the surface of the disc upon which the composition packing cup is to be molded, is first brass plated and then the cup is molded on to the disc and the adhesion of the molded cup to the brass plated disc is such as not to require a follower or compression disc as employed in the construction shown in Fig. 1.

In the construction shown in Fig. 5, the groove 27, for carrying the lubricating wick 14, is formed entirely in the packing cup. An opening 25, shown in Fig. 6, is provided through the side wall of the cup to the wick groove and the ends of the wick are brought out through said opening and twisted together, so as to hold the wick in place. It will be noted that a portion of the flared end of the piston disc 7 extends into the body of the packing cup, so that the packing cup is molded over the end of and part way down the right hand side of said disc. This is done in order to better ensure that atmospheric pressure in chamber 16 will not tear the packing cup from the piston disc 7 when the pressure in chamber 17 is reduced.

The construction illustrated in Fig. 7 is very similar to that in Fig. 5, except that the packing cup 28, which is similar to the cup shown in Fig. 1, is permanently molded to the piston disc 6 instead of to the piston disc 7, and according to this construction the packing cup is on the right hand side of the piston disc 6 and subject to the atmospheric pressure in chamber 16, so that in operation there is no tendency for the packing cup to be torn from the piston disc.

It will now be evident that according to my improvements, a composition packing cup is provided having means molded in the heel of the cup for retaining a lubricating wick and a rib or other means molded interiorly of and adjacent to the edge of the skirt for retaining an expander ring in the packing cup so as to ensure full engagement of the skirt of the packing cup with the wall of the cylinder in which it is adapted to operate. Furthermore, an improved piston is provided, which consists of a packing cup permanently molded to a piston disc in such a manner that a unitary structure is provided which does not require the ordinary follower plate.

While a number of illustrative embodiments of the invention have been described in detail, it is not my intention to limit its scope to these embodiments or otherwise than by the terms of the appended claims.

Having now described my invention, what I claim as new and desire to secure by Letters Patent, is:

1. The combination with a cylinder and a piston mounted in said cylinder, said piston comprising a metal disc, a packing cup comprising a skirt portion engaging the cylinder and a ring portion adhering to the high pressure side of said disc, said packing cup having an annular groove near the junction of the ring and skirt portions, said groove cooperating with said metal disc to provide an annular recess, and a lubricating wick carried in said recess and engaging said cylinder.

2. The combination with a cylinder and a piston in said cylinder, said piston comprising a disc, a packing cup having a ring portion secured to said disc, a skirt portion projecting from said ring portion into engagement with said cylinder, and a portion spaced from the wall of said cylinder and provided with an annular groove, and a lubricating wick in said groove engaging the wall of said cylinder for conveying lubricant peripherally of said piston and for spreading lubricant on the wall of said cylinder upon movement of said piston.

3. In combination, a cylinder and a piston in said cylinder, said piston comprising a disc, a packing cup carried by said disc and having an annular groove in its periphery adjacent said disc, and a lubricating wick carried in said groove, a portion of the disc contacting said wick and cooperating with said groove for carrying the wick.

4. In combination, a cylinder and a piston in said cylinder, said piston comprising a disc, a packing cup arranged concentrically of and carried by said disc and comprising a ring portion secured to said disc and a skirt portion projecting from said ring portion and engaging said cylinder, and a lubricating wick carried by said piston and engaging the cylinder, said packing cup being provided with an annular groove at the junction of said ring portion and said skirt portion, a portion of the disc contacting said wick and cooperating with said groove for carrying the wick.

5. In combination, a cylinder and a piston movably mounted in said cylinder and forming at one side a high pressure chamber and at the opposite side a low pressure chamber, said piston comprising a disc and a packing cup having a skirt portion flaring outwardly from the disc toward the high pressure chamber into engagement with the wall of said cylinder for effecting a seal, said skirt portion having an annular groove in its peripheral face at the low pressure edge thereof, and a lubricating wick disposed in said groove in contact with a portion of said disc that cooperates with said groove to carry said wick into engagement with the wall of said cylinder for conveying lubricant by capillary action circumferentially of said piston and to said wall.

6. In combination, a cylinder and a piston movably mounted in said cylinder, said piston comprising a disc and a packing cup having a skirt portion flaring outwardly from the disc and slidably engaging the wall of said cylinder over a peripheral area adjacent the outer edge thereof, a peripheral groove in said skirt portion at the edge thereof adjacent said disc, and an absorbent wick disposed in said groove in contact with a portion of said disc that cooperates with said groove to carry said wick in engagement with the wall of said cylinder for conveying lubricant by capillary action circumferentially of the piston and to said wall.

7. In combination, a cylinder and a piston movably mounted in said cylinder, said piston comprising a central portion and a skirt portion affixed to and carried by said central portion and engaging the wall of said cylinder, a peripheral groove in said skirt portion at the edge thereof adjacent said central portion, and a lubricating wick in said peripheral groove, a portion of the central portion contacting said wick and cooperating with said groove for carrying the wick.

RAYMOND E. MILLER.